(12) United States Patent
Kohls et al.

(10) Patent No.: US 6,928,618 B2
(45) Date of Patent: Aug. 9, 2005

(54) INTELLIGENT DRAG OF ASSEMBLY COMPONENTS

(75) Inventors: Scott T. Kohls, Canton, MI (US); Gary R. Smith, Commerce Township, MI (US)

(73) Assignee: Autodesk, Inc., San Rafael, CA (US)

( * ) Notice: Subject to any disclaimer, the term of this patent is extended or adjusted under 35 U.S.C. 154(b) by 694 days.

(21) Appl. No.: 10/001,375

(22) Filed: Oct. 23, 2001

(65) Prior Publication Data

US 2003/0076356 A1 Apr. 24, 2003

(51) Int. Cl.$^7$ ................................. G09G 5/00
(52) U.S. Cl. ..................... 715/764; 345/642; 345/652; 715/700; 715/767; 715/781; 700/97; 700/103
(58) Field of Search ................. 345/619, 642, 345/652, 663, 700, 764, 767, 769, 781, 851, 856, 964; 715/700, 764, 767, 769, 781, 851, 856, 964; 700/97–98, 178, 182, 184, 103–104, 219–220

(56) References Cited

U.S. PATENT DOCUMENTS

| | | | |
|---|---|---|---|
| 5,123,087 A | | 6/1992 | Newell et al. ............... 715/862 |
| 5,133,052 A | | 7/1992 | Bier et al. ................... 715/530 |
| 5,444,836 A | | 8/1995 | Hollingsworth et al. .... 345/634 |
| 5,572,639 A | | 11/1996 | Gantt ......................... 345/651 |
| 5,577,189 A | | 11/1996 | Gay et al. ................... 715/800 |
| 5,815,154 A | | 9/1998 | Hirschtick et al. .......... 715/853 |
| 5,894,310 A | | 4/1999 | Arsenault et al. ........... 345/679 |
| 6,016,147 A | | 1/2000 | Gantt ......................... 345/420 |
| 6,219,049 B1 | * | 4/2001 | Zuffante et al. ............ 715/764 |
| 6,219,055 B1 | * | 4/2001 | Bhargava et al. ........... 715/850 |
| 6,441,837 B1 | * | 8/2002 | Harding et al. ............. 715/856 |
| 6,480,813 B1 | * | 11/2002 | Bloomquist et al. ........... 703/1 |
| 6,512,519 B1 | * | 1/2003 | Arsenault et al. ........... 345/441 |
| 6,614,458 B1 | * | 9/2003 | Lambert et al. ............. 715/856 |

OTHER PUBLICATIONS

Google Groups BLTA, Messages from the thread "Component pattern–pattern," http://groups.google.com/group1s?h1=cn&safe=off&th=b74993733c9952b3, 8&seelcm=8iaha . . . pp. 6 ©2001.
Autodesk Inventor—Release 3, "Learn about arranging components in patterns." 1 pg. Jun. 23, 2000.
Autodesk Inventor—Release 3, "To arrange features in a rectangular pattern," 1 pg. Jun. 23, 2000.
Autodesk Inventor—Release 3, "To arrange components in a circular pattern," 1 pg. Jun. 23, 2000.
Autodesk Inventor—Release 3, "To arrange components in a rectangular pattern," 1 pg. Jun. 23, 2000.
Autodesk Inventor—Release 3, "Pattern components," 1 pg. Jun. 23, 2000.
Autodesk Inventor—Release 3, "To arrange features in a circular pattern," 1 pg. Jun. 23, 2000.
Autodesk Inventor—Release 3, "Rectangular pattern," pp. 2 Jun. 23, 2000.
Autodesk Inventor—Release 3, "Learn about arranging features in patterns," 1 pg. Jun. 23, 2000.

(Continued)

*Primary Examiner*—John Cabeca
*Assistant Examiner*—Cuong T. Thai
(74) *Attorney, Agent, or Firm*—Gates & Cooper LLP (57) ABSTRACT

One or more embodiments of the invention provide a method, apparatus, and article of manufacture for positioning a graphical component in a computer-implemented drawing program. A selection of a graphical component displayed on a display device is received. Thereafter, a first feature of the graphical component is inferred. The display of the graphical component is moved (e.g., by a user using a cursor control device). Underlying geometry is then analyzed to determine one or more second features of the underlying geometry that can mate with the first feature. Feedback is then displayed that indicates placement potential for the graphical component based on the first feature mating with one of the second features.

45 Claims, 5 Drawing Sheets-

OTHER PUBLICATIONS

Autodesk Inventor—Release 3, "Circular pattern," 2 pgs. Jun. 23, 2000.

Autodesk Inventor—Release 3, "Getting Started" pp. 20 Jun. 23, 2000.

SolidWorks Corporation, "Solidworks Corporation Introduces Solidworks © 1999," http://www.solidworks.com/Autorelease/html/prSolidWorks99.htm pp. 4 ©1999.

* cited by examiner

INTELLIGENT DRAG OF ASSEMBLY COMPONENTS

CROSS-REFERENCE TO RELATED APPLICATIONS

This application is related to the following co-pending and commonly-assigned patent application, which application is incorporated by reference herein:

U.S. patent application Ser. No. 09/966,656, entitled "INTELLIGENT CONSTRAINT DEFINITIONS FOR ASSEMBLY PART MATING", filed on Sep. 28, 2001 by Scott T. Kohls, et. al.

BACKGROUND OF THE INVENTION

1. Field of the Invention

The present invention relates generally to computer-implemented drawing programs, and in particular, to a method, apparatus, and article of manufacture for dragging and intelligently placing assembly components in a drawing.

2. Description of the Related Art

Computer-implemented drawing programs (e.g., a solid modeling or computer aided design [CAD] program) are often used to create, view, and modify solid models, assemblies, diagrams, flow charts, blue-prints, etc. (collectively referred to as drawings) in both two dimensions (2D) and three dimensions (3D). The drawings comprise one or more graphical elements (referred to as components or parts) arranged in a defined format. In turn, the graphical elements may comprise one or more smaller graphical elements/entities (referred to as features).

Components/parts may often be related to each other. For example, one part (e.g., a bolt) may be related or intended to fit into another part (e.g., a washer or nut). To establish the relationship, constraints may be placed on the parts. For example, a bolt may be constrained to a washer. The constraints between the parts are based on features in the related parts. For example, the center axis feature of a bolt may be constrained to a center axis feature of a hole in the washer. Thus, the constraints are often specified for particular features in a part.

Constraining one or more parts to a particular position or relationship with another part (also referred to as mating information) are available in the prior art. However, placing/positioning a graphical component in accordance with a constraint (as desired) is often a laborious process that requires significant user interaction through a graphical user interface.

For example, multiple user actions may be necessary to select a feature of a part and create a constraint for that feature. Further, multiple user actions may be necessary to select a particular constraint of a component. Additionally, once the particular constraint has been selected, placing the component with respect to another component based on the particular constraint requires multiple steps by a user.

What is needed is an easy and efficient manner for quickly placing/positioning a component in a drawing using available constraints.

SUMMARY OF THE INVENTION

One or more embodiments of the invention provide a method, apparatus, and article of manufacture for positioning a graphical component in a computer-implemented drawing program. When dragging a part in an assembly, to reposition the part, a user may click on the part with the cursor and hold down the mouse button.

The underlying geometry is actively analyzed and several types of feedback are provided/displayed that show how the part will be positioned. The feedback is unique and provides the user with valuable input so that the final selected position can be understood prior to committing to that position. The feedback mechanism may comprise a set of visual positioning characters or glyphs. The feedback shows what type of constraint will be applied and can be dynamically changed by selecting one of a set of special keys from the keyboard or by dragging the part over a specific geometry type.

This "click-n-drag" style assembly mating offers users more control over how constraints are applied and can be activated or de-activated by simply holding down a key (e.g., the ALT or CTRL key) when selecting the part to be positioned. Accordingly, a user is provided with a way to quickly mate components without ever bothering to actually enter a constraint command.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
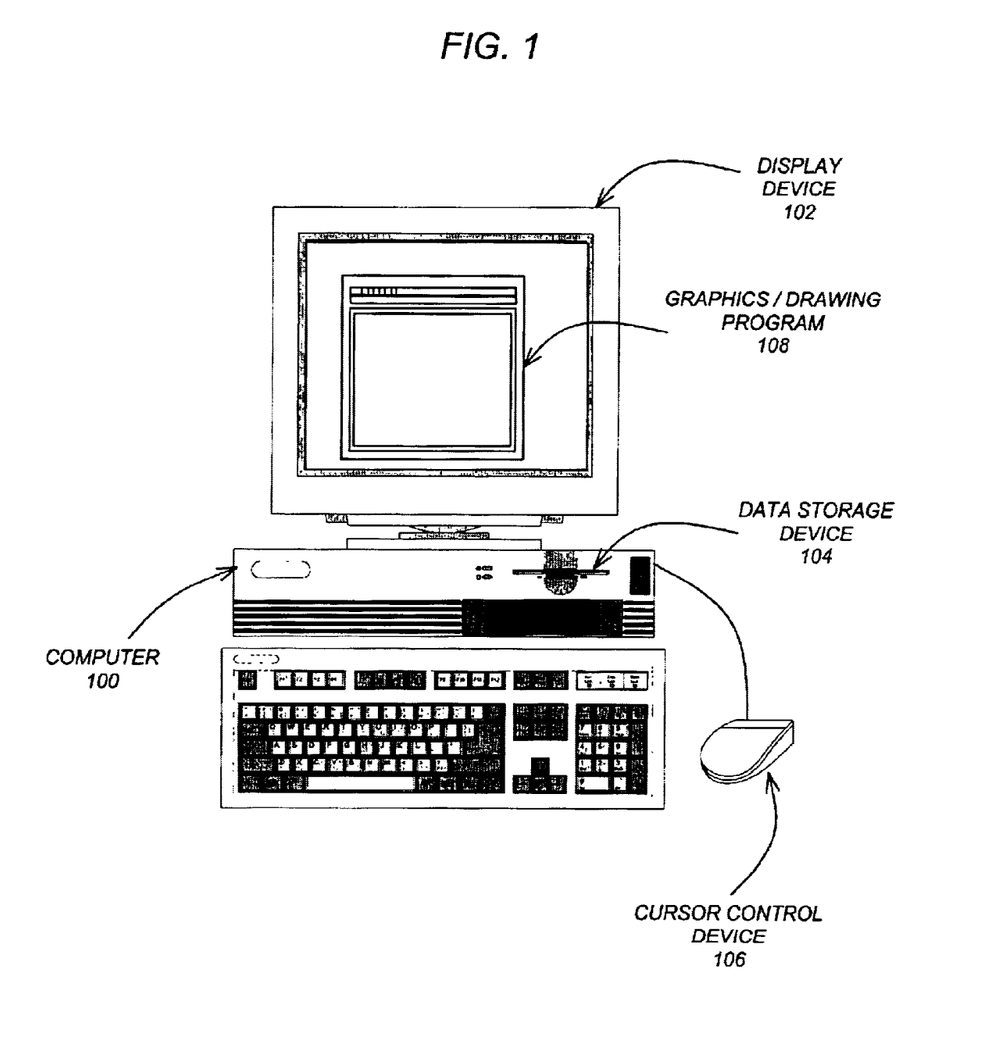
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes, inter alia, a display device 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented graphics program 108, wherein the graphics program 108 is represented by a window displayed on the display device 102. Generally, the graphics program 108 comprises logic and/or data embodied in or readable from a device, media, carrier, or signal, e.g., one or more fixed and/or removable data storage devices 104 connected directly or indirectly to the computer 100, one or more remote devices coupled to the computer 100 via a data communications device, etc. Further, the cursor control device 106 may be used by a user to control, place, and position graphics component(s) within graphic program 108.

Those skilled in the art will recognize that the exemplary environment illustrated in FIG. 1 is not intended to limit the present invention. Indeed, those skilled in the art will recognize that other alternative environments may be used without departing from the scope of the present invention.

Software Embodiments

Graphics/drawing program 108 is configured to create, view, and modify drawings (as set forth in the background) displayed on display device 102 in 2D and/or 3D. Such drawings comprise one or more graphical elements. A graphical element may comprise a part or a component. A part or a component may comprise any 2D or 3D geometrical shape or entity that may or may not represent a real-world item such as a washer, bolt, cylinder, cube, nozzle, etc. Each graphical element is made up of one or more features that provide characteristics for the graphical element. For example, a cylinder with a hole may have a cylinder feature and a hole feature.

As described above, a user may desire to place one graphical component with respect to another graphical component based on one or more constraints of the two components. In accordance with one or more embodiments of the invention, the graphics program 108 allows a user to easily, quickly, and efficiently place a component with respect to another component based on constraints/features of the components.

To place a component, a user merely needs to select and drag one graphical component towards/over another graphical component. Based on a location of a cursor when the first graphical component is selected, one or more features or constraints in the graphical component are inferred. As the graphical component is dragged, underlying geometry is analyzed to determine appropriate mates for the inferred features/constraints. The graphics program 108 then provides feedback that shows how the graphical component can/will be positioned.

The feedback is unique and provides the user with valuable input so that the final selected position of the graphical component can be understood prior to committing to that position. The feedback may include a set of visual positioning characters/glyphs or may allow the user to preview the placement for the graphical component. The feedback shows what type of constraint will be applied and can be dynamically changed by selecting one of a set of special keys from the keyboard or by dragging the component over a specific geometry type. This "click-n-drag" style assembly mating offers users more control over how constraints are applied and can be activated or de-activated by simply holding down a key (e.g., the CTRL key or ALT key) when selecting a component to be repositioned. Accordingly, the user is provided with a mechanism to quickly mate components without ever bothering to actually enter a constraint command.

By intelligently inferring the desired feature on a selected component and identifying valid geometric or topologic mates for the feature, a dynamic preview/drag/mate capability may be provided.

Figure 2:
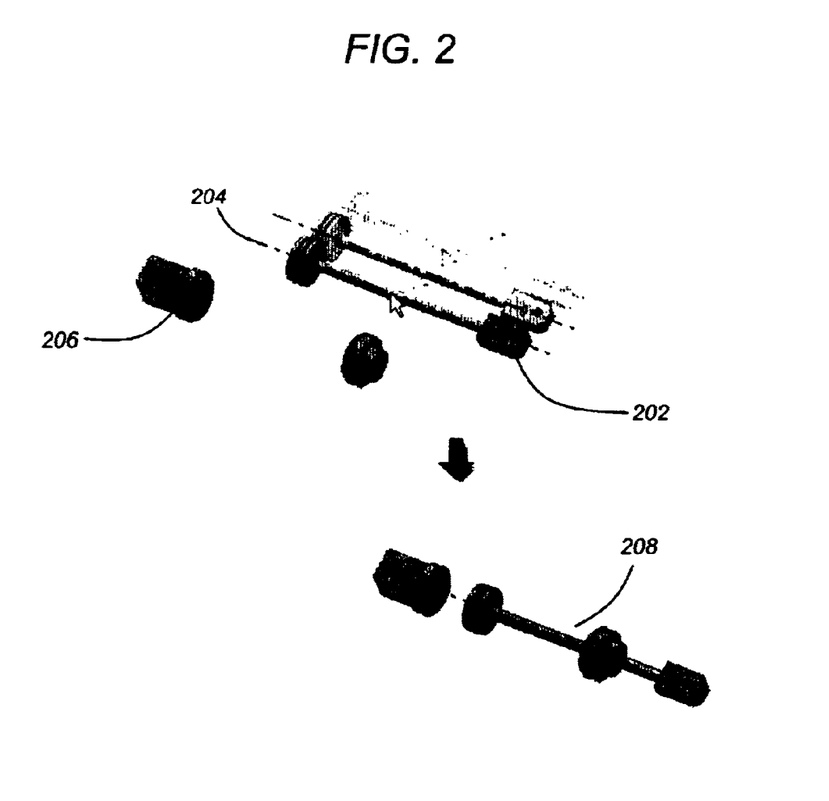
FIG. 2 illustrates the placement of a component based on an axis constraint in accordance with one or more embodiments of the invention.

FIG. 2 illustrates the placement of a component based on an axis constraint in accordance with one or more embodiments of the invention. Holding down the ALT key, the user selects the piston/rod subassembly component 202 and begins to drag the component 202. Since the cursor was located over the rod's 202 cylindrical surface, the system infers the axis 204 as the feature to find an appropriate mate for.

As the rod 202 is dragged, underlying geometry is analyzed to find an appropriate mate. Upon dragging the rod 202 over the cylindrical surface of the cylinder body 206, the system analyzes the cylindrical body 206 to find/determine an appropriate mate for the axis 204 (e.g., an axis of cylindrical body 206). Once a mate is found, the axis 204 of rod 202 snaps to the axis of cylindrical body 206. Accordingly, a preview 208 of a potential placement of rod 204 with respect to cylindrical body 206 is displayed. If the user desires to retain the position of the parts 202 and 206 as displayed in the preview 208, the user merely releases the mouse to place the components as previewed.

Figure 3:
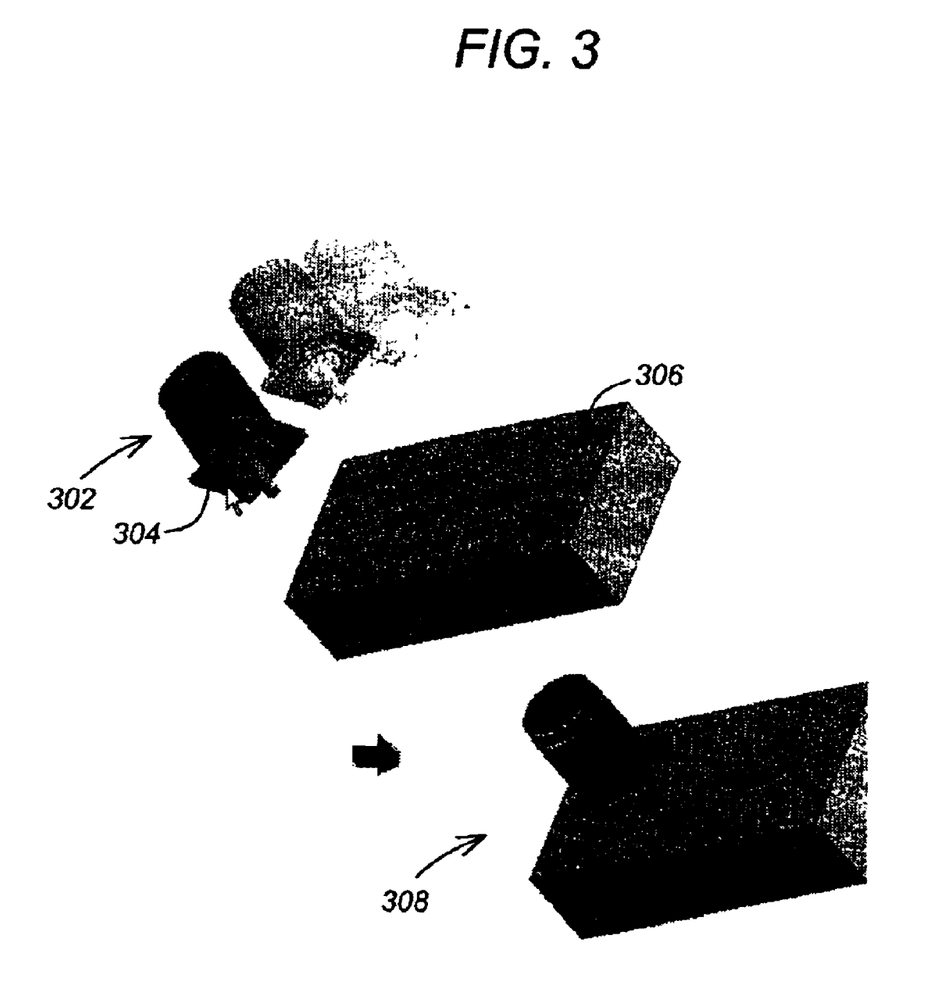
FIG. 3 illustrates the placement of a component based on a face constraint in accordance with one or more embodiments of the invention.

FIG. 3 illustrates another example of the placement of a component. However, in FIG. 3, the placement is based on a face constraint. Holding down the ALT key, the user selects the stepper motor subassembly component 302 and begins to drag the component 302. Since the cursor was located over the stepper motor's front mounting face 304, the system infers the front mounting face 304 as the feature (i.e., a planar mate feature) to find an appropriate mate for.

As the stepper motor 302 is dragged, underlying geometry is analyzed to find an appropriate mate. Upon dragging the stepper motor 302 over the flat top face of the enclosure 306, the system analyzes the enclosure 306 to find/determine an appropriate mate for the front mounting face 304 (e.g., a planar face of enclosure 306). Once a mate is found, the front mounting face 304 of stepper motor 302 snaps to the face/face mate of enclosure 306. Accordingly, a preview 308 of a potential placement of stepper motor 304 with respect to enclosure 306 is displayed. To retain the position of the parts 302 and 306 as displayed in the preview 308, the depressed mouse button may be released.

Figure 4:
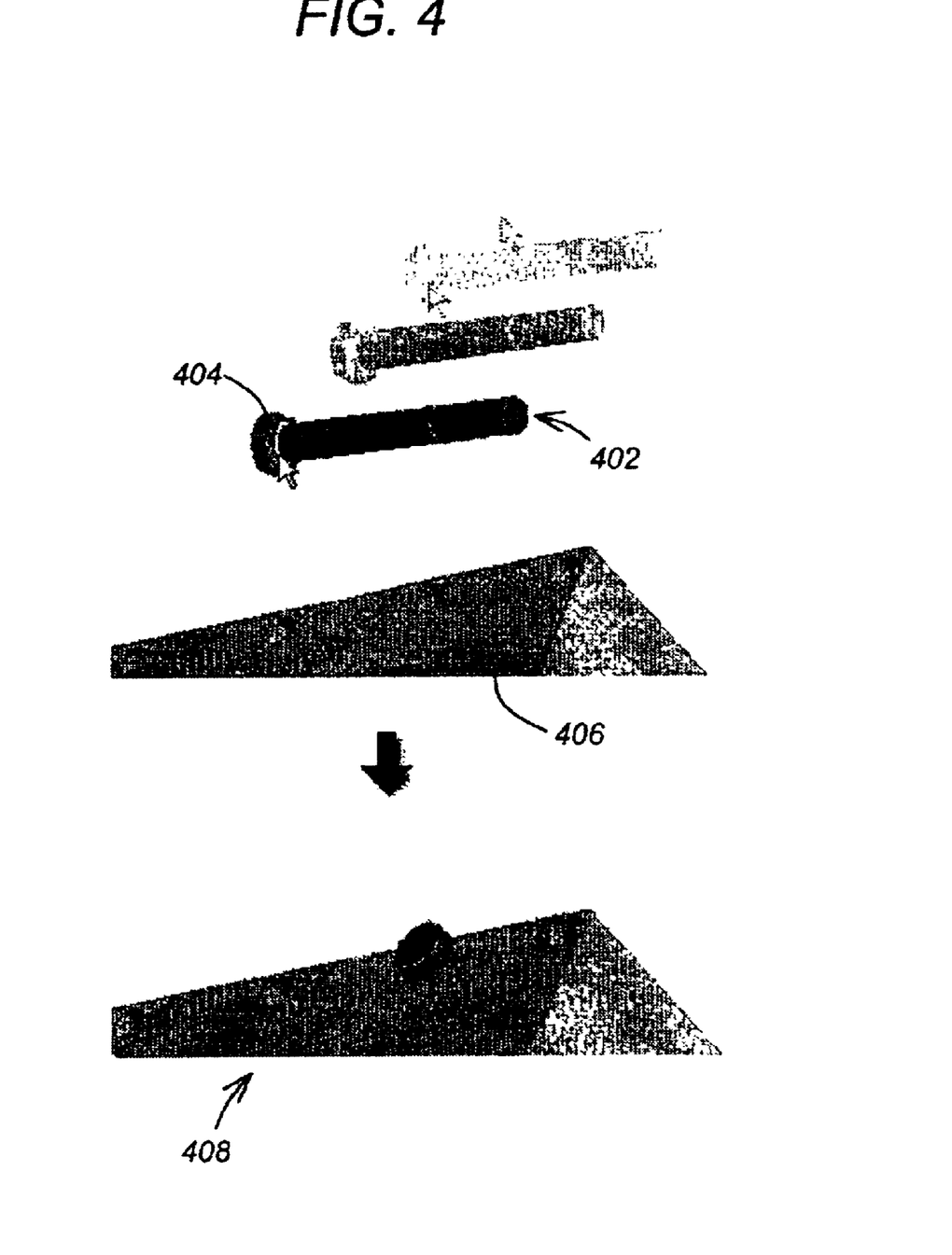
FIG. 4 illustrates the placement of a component based on a circular constraint in accordance with one or more embodiments of the invention.

FIG. 4 is another example of the placement of a component based on a circular constraint in accordance with one or more embodiments of the invention. Similar to the other examples, holding down the ALT key, the user selects the bolt insert component 402 and begins to drag the bolt 402. Since the cursor was located over a circle 404 around the bolt 402, the system infers the circle 404 as the feature to find an appropriate mate for.

As the bolt 402 is dragged, underlying geometry is analyzed to find an appropriate mate. Upon dragging the bolt 402 over the receiving unit 406, the system analyzes the receiving unit 406 to find/determine an appropriate mate for the circle 404 (e.g., a circle of receiving unit 406). Once a mate is found (i.e., one of the holes in receiving unit 406), the circle 404 of bolt 402 snaps to the circle of one of the holes in receiving unit 406. Accordingly, a preview 408 of a potential placement of bolt 404 with respect to receiving unit 406 is displayed. If the user desires to retain the position of the parts 402 and 406 as displayed in the preview 408, the use merely releases the mouse to place the components as previewed.

Figure 5:
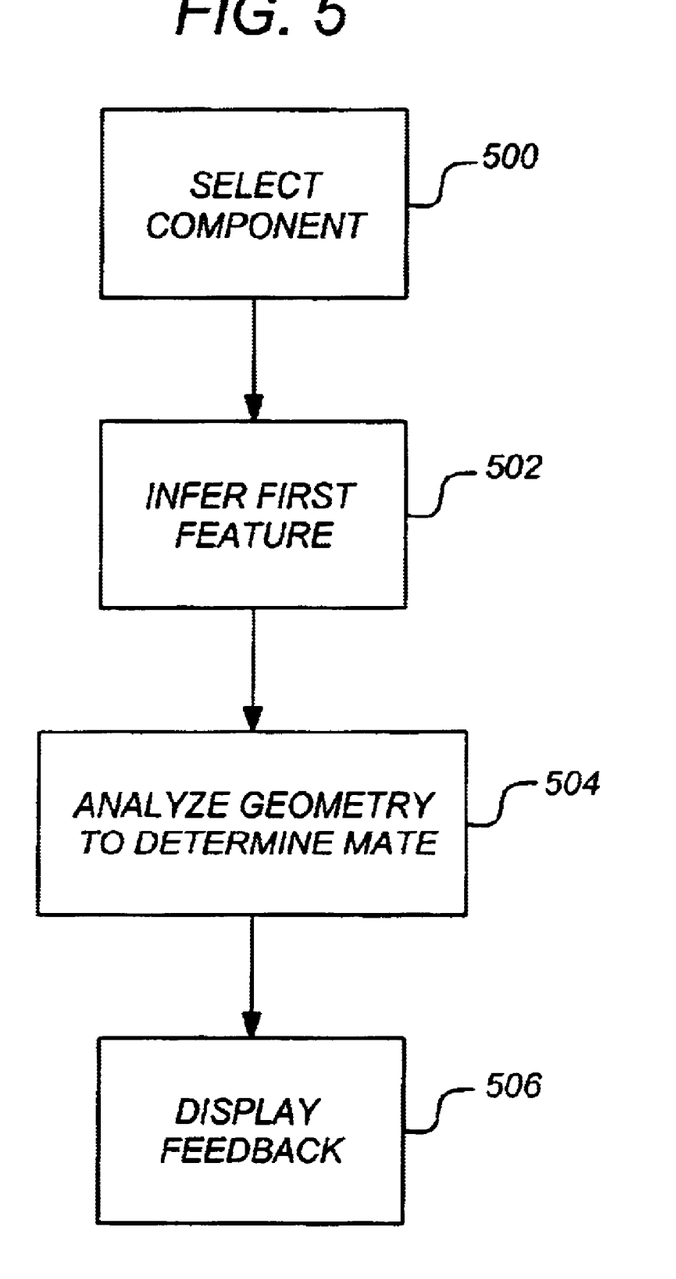
FIG. 5 is a flow chart illustrating the placement of components in accordance with the above examples and one or more embodiments of the invention.

FIG. 5 is a flow chart illustrating the placement of components in accordance with the above examples and one or more embodiments of the invention. At step 500, a graphical component displayed on a display device is selected (e.g., by a user). Such a selection, in accordance with the invention, may be identified by the user holding down a particular key when selecting a component with a cursor control device 106. For example, the CTRL key or ALT key may be held down during the component selection process. Accordingly, the placement of the component as described herein may be activated or de-activated by simply holding down the appropriate key when selecting a component to be repositioned.

At step 502, a first feature of the selected graphical component is inferred. Such an inference is likely based on the location of a cursor when the component is selected in step 500 and an indication of the selection may be displayed (e.g., displaying a feature in a different color, flashing, or another visual indicator). Once selected, the selected graphical component may be moved. Such movement represents the "dragging" of the selected component (e.g., reflective of the movement of the cursor controlled by a user operating a cursor control device 106).

At step 504, underlying geometry is analyzed to determine one or more second features of the underlying geometry that can mate with the first inferred feature. Thus, based on the first inferred feature, one or more second features in the underlying geometry that may mate with the first feature are determined. Accordingly, in one or more embodiments, only those features in the underlying geometry that can mate with the first feature are identified (and not all available constraints of the underlying geometry).

At step 506, feedback that indicates placement potential for the selected graphical component based on the first feature mating with one or more of the second features is displayed. The feedback shows how the part will be positioned, is unique, and provides the user with valuable input so that a final selected position can be understood prior to committing to that position.

As described above, such feedback may comprise a visual indication of the placement potential, a preview of the component, and/or an indication of the type of constraint that will be applied. For example, the second feature may be highlighted, blink, or displayed differently in some manner. Alternatively, a set of visual positioning characters or glyphs may be displayed. Additionally/alternatively, a preview of the selected graphical component with the first and second features in a mated position may be displayed.

Further, as the component is dragged/moved, the feedback presented on the display may change dynamically. Thus, as the component is moved over different/specific geometric features, different mates/feedback may be displayed that illustrate the potential placement for the component. For example, referring to FIG. 4, as the bolt 402 is moved over the different holes in receiving unit 406, a different preview illustrating the bolt 402 in a particular hole may be displayed.

Additionally, when multiple mates are available, the user may have the capability to scroll between or choose the mate desired. For example, using special keys from a keyboard, a different mate may be selected. When multiple mates are available, a particular mate or constraint type may be inferred by the system. Thereafter, a user may have the capability to override the inference. Further, when an inferred constraint type is overridden, geometric selections (e.g., available mates) may be automatically updated as appropriate for the new constraint type if necessary.

Alternatively, users may have the capability to cycle through solutions for a given constraint type using the keyboard. For example, if the user drags a cylinder over another cylinder and presses the "i" key to change the mate into an insert constraint, the geometric selections may change from cylinder selections to vectored circle selections that are appropriate to the insert constraint.

Once a constraint type is selected, available mates of that constraint type may be selected. For example, if the user presses the <SPACEBAR>, the solution (direction) of the insert may change. Moreover, since each constraint type has its own solution (e.g., a mate has a mate and flush solution, a tangent has an inside and outside solution, etc.) the operation of the <SPACEBAR> may be dependent on the current constraint type. Such an override feature may reduce the number of keys that the user might otherwise have to know if each solution cycle tool were instead assigned to its own unique key.

Once an appropriate constraint is available, the user may elect to place the component based on the first feature mating with one of the second features. Releasing a button on a cursor control device 106, for example may enable such placement.

As illustrated above, components may be intelligently dragged and placed in an assembly. To provide such placement capabilities that are efficient and easy to use, various additional functionality/options may not be enabled. For example, in one or more embodiments of the invention, offset, angle, flip, motion ratio, tangency, flush, and select other capabilities may not be provided.

CONCLUSION

This concludes the description of one or more embodiments of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for positioning a graphical component in a computer-implemented drawing program, comprising:
    (a) selecting a graphical component displayed on a display device;
    (b) inferring a first feature of the selected graphical component;
    (c) analyzing underlying geometry to determine one or more second features of the underlying geometry that are capable of mating with the first feature, wherein:
        (i) each of the one or more second features has a constraint type;
        (ii) potential mates for the first component are limited to a particular constraint type; and
        (iii) a different constraint type is selected using a keyboard; and
    (d) displaying feedback that indicates placement potential for the selected graphical component based on the first feature mating with one of the second features.

2. The method of claim 1 further comprising displaying an indication of the selected first feature.

3. The method of claim 1 wherein the first feature is inferred based on a location of a cursor when the graphical component was selected.

4. The method of claim 1 wherein a key is held down during the selection of the graphical component.

5. The method of claim 1 wherein underlying geometry is analyzed as the selected graphical component is moved in accordance with a movement of a cursor.

6. The method of claim 1 wherein displaying feedback comprises displaying a preview of the selected graphical component in a placement position.

7. The method of claim 1 wherein the feedback comprises a set of visual positioning characters.

8. The method of claim 1 wherein the feedback indicates a type of constraint that will be applied.

9. The method of claim 8 wherein the type of constraint may be changed by a user.

10. The method of claim 8 wherein the one or more second features are limited to the type of constraint.

11. The method of claim 1 wherein the feedback dynamically changes as the selected graphical component is moved over one or more of the second features.

12. The method of claim 1 further comprising placing the selected graphical component based on the first feature mating with one of the second features.

13. The method of claim 12 wherein:
the graphical component is selected when a mouse button is depressed; and
the selected graphical component is placed when the mouse button is released.

14. The method of claim 1 wherein:
one of the second features that can mate with the first feature is inferred; and
one or more a alternative second features that can mate with the first feature may be selected using a keyboard.

15. The method of claim 1 wherein one or more second features having a particular constraint type may be cycled through for selection using a keyboard.

16. A system for positioning a graphical component comprising:
(a) a computer system having a memory and a data storage device coupled thereto;
(b) a drawing program executing on the computer system, the drawing program configured to:
(i) select a graphical component displayed on a display device;
(ii) infer a first feature of the selected graphical component;
(iii) analyze underlying geometry to determine one or more second features of the underlying geometry that are capable of mating with the first feature, wherein:
(1) each of the one or more second features has a constraint type;
(2) potential mates for the first component are limited to a particular, constraint type; and
(3) a different constraint type is selected using a keyboard; and
(iv) display feedback that indicates placement potential for the selected graphical component based on the first feature mating with one of the second features.

17. The system of claim 16 wherein the drawing program is further configured to display an indication of the selected first feature.

18. The system of claim 16 wherein the first feature is inferred based on a location of a cursor when the graphical component was selected.

19. The system of claim 16 wherein a key is held down during the selection of the graphical component.

20. The system of claim 16 wherein the underlying geometry is analyzed as the selected graphical component is moved in accordance with a movement of a cursor.

21. The system of claim 16 wherein the computer program is configured to display feedback by displaying a preview of the selected graphical component in a placement position.

22. The system of claim 16 wherein the feedback comprises a set of visual positioning characters.

23. The system of claim 16 wherein the feedback indicates a type of constraint that will be applied.

24. The system of claim 23 wherein the type of constraint may be changed by a user.

25. The system of claim 23 wherein the one or more second features are limited to the type of constraint.

26. The system of claim 16 wherein the feedback dynamically changes as the graphical component is moved over one or more of the second features.

27. The system of claim 16, wherein the computer program is further configured to place the graphical component based on the first feature mating with one of the second features.

28. The system of claim 27 wherein:
the graphical component is selected when a mouse button is depressed; and
the selected graphical component is placed when the mouse button is released.

29. The system of claim 16 wherein:
one of the second features that can mate with the first feature is inferred; and
one or more a alternative second features that can mate with the first feature may be selected using a keyboard.

30. The system of claim 16 wherein one or more second features having a particular constraint type may be cycled through for selection using a keyboard.

31. An article of manufacture comprising a program storage medium readable by a computer and embodying one or more instructions executable by the computer to perform a method for positioning a graphical component, the method comprising:
(a) selecting a graphical component displayed on a display device;
(b) inferring a first feature of the selected graphical component;
(c) analyzing underlying geometry to determine one or more second features of the underlying geometry that are capable of mating with the first feature, wherein:
(i) each of the one or more second features has a constraint type;
(ii) potential mates for the first component are limited to a particular constraint type; and
(iii) a different constraint type is selected using a keyboard; and
(d) displaying feedback that indicates placement potential for the selected graphical component based on the first feature mating with one of the second features.

32. The article of manufacture of claim 31, wherein the method further comprises displaying an indication of the selected first feature.

33. The article of manufacture of claim 31 wherein the first feature is inferred based on a location of a cursor when the graphical component was selected.

34. The article of manufacture of claim 31 wherein a key is held down during the selection of the graphical component.

35. The article of manufacture of claim 31 wherein the underlying geometry is analyzed as the graphical component is moved in accordance with a movement of a cursor.

36. The article of manufacture of claim 31 wherein displaying feedback comprises displaying a preview of the selected graphical component in a placement position.

37. The article of manufacture of claim 31 wherein the feedback comprises a set of visual positioning characters.

38. The article of manufacture of claim 31 wherein the feedback indicates a type of constraint that will be applied.

39. The article of manufacture of claim 38 wherein the one or more second features are limited to the type of constraint.

40. The article of manufacture of claim 38 wherein the feedback dynamically changes as the graphical component is moved over one or more of the second features.

41. The article of manufacture of claim 31 wherein the feedback dynamically changes as the selected graphical component is moved over one or more of the second features.

42. The article of manufacture of claim 31, wherein the method further comprises placing the graphical component based on the first feature mating with one of the second features.

43. The article of manufacture of claim 42 wherein:
the graphical component is selected when a mouse button is depressed; and
the selected graphical component is placed when the mouse button is released.

44. The article of manufacture of claim 31 wherein:
one of the second features that can mate with the first feature is inferred; and
one or more a alternative second features that can mate with the first feature may be selected using a keyboard.

45. The article of manufacture of claim 31 wherein one or more second features having a particular constraint type may be cycled through for selection using a keyboard.

* * * * *